(12) United States Patent
Earl et al.

(10) Patent No.: US 9,965,357 B1
(45) Date of Patent: May 8, 2018

(54) VIRTUAL BACKUP AND RESTORE OF VIRTUAL MACHINES

(71) Applicant: EMC CORPORATION, Hopkinton, MA (US)

(72) Inventors: Min-Chih L. Earl, Redmond, WA (US); Brian J. Bishop, Redmond, WA (US); Matthew D. Buchman, Seattle, WA (US); Mohammed A. Akanda, Redmond, WA (US); Jerzy Gruszka, Lacey, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 208 days.

(21) Appl. No.: 13/800,732

(22) Filed: Mar. 13, 2013

(51) Int. Cl.
G06F 17/30 (2006.01)
G06F 11/14 (2006.01)

(52) U.S. Cl.
CPC .................. *G06F 11/1451* (2013.01)

(58) Field of Classification Search
CPC ............. G06F 11/1464; G06F 11/1458; G06F 11/1446
USPC ........................................ 707/640, 644, 649
See application file for complete search history.

(56) References Cited

U.S. PATENT DOCUMENTS

| 8,219,769 | B1 * | 7/2012 | Wilk .............................. 711/162 |
| 8,484,163 | B1 * | 7/2013 | Yucel et al. .................. 707/640 |
| 8,943,203 | B1 * | 1/2015 | Lent .................. G06F 17/30197 709/203 |
| 2008/0115008 | A1 * | 5/2008 | Daftardar ............ G06F 11/2092 714/3 |
| 2011/0307886 | A1 * | 12/2011 | Thanga ................. G06F 9/5077 718/1 |
| 2012/0150805 | A1 * | 6/2012 | Pafumi et al. ................. 707/640 |
| 2012/0266170 | A1 * | 10/2012 | Zimmerman ............. G06F 8/63 718/1 |
| 2012/0323853 | A1 * | 12/2012 | Fries et al. ..................... 707/649 |
| 2013/0346260 | A1 * | 12/2013 | Jubran .................. G06F 9/5072 705/28 |
| 2014/0007092 | A1 * | 1/2014 | Barbee .................. G06F 9/4856 718/1 |
| 2014/0095816 | A1 * | 4/2014 | Hsu et al. ..................... 711/162 |

* cited by examiner

*Primary Examiner* — Ashish Thomas
*Assistant Examiner* — Jedidiah P Ferrer
(74) *Attorney, Agent, or Firm* — Workman Nydegger

(57) ABSTRACT

Systems and methods for backing up and restoring virtual machines in a cluster environment. An instrumentation interface enables configuration data to be stored with save sets during backup and enables the configuration of the destination to be adjusted based on the stored configuration during a restore.

13 Claims, 3 Drawing Sheets

VIRTUAL BACKUP AND RESTORE OF VIRTUAL MACHINES

BACKGROUND OF THE INVENTION

1. The Field of the Invention

Embodiments of the present invention relate to backing up and restoring data. More particularly, embodiments of the invention relate to systems and methods for backing up and/restoring virtual machines in cluster environments.

2. The Relevant Technology

In conventional systems, data is often backed up by simply making a copy of the source data. To make this process more efficient, snapshot technologies have been developed that provide additional versatility to both backing up data and restoring data. Using snapshots, it is possible to backup data in a manner than allows the data to be restored at various points in time.

Because there is a need to have reliable data and to have that data available in real-time, emphasis is placed on systems that can accommodate failures that impact data. As computing technologies and hardware configurations change, there is a corresponding need to develop backup and restore operations that can accommodate the changes.

Cluster technologies (clusters) are examples of systems where reliable backup and restore processes are needed. Clusters provide highly available data and are difficult to backup and restore for various reasons. In fact, clusters often include virtualized environments and a node in the cluster, for example, may host virtual machines. When a portion (e.g., a virtual machine operating on a node) of a cluster fails, the cluster is able to make the data previously managed by that virtual machine available at another location in the cluster, often on another node. Unfortunately, the failover process can complicate the backup and restore operations.

While backing up data in a virtual environment is complicated, restoring the data can be even more complicated. For example, a virtual machine may be restored to a different location or to a different location that may have a different configuration. These types of changes complicate the restoration of the data for many reasons. For example, the Access Control Lists (ACLs) on the files of a virtual machine may not operate correctly in a new location since they were not associated with a real system account. Further, when a virtual machine is moved to a different location and the restoration of an older version of the virtual machine is desired, the restoration may not be able to accommodate this type of change in the configuration.

More generally stated, because the configuration of the cluster and/or the nodes in the cluster can change over time or due to software upgrades, for example, the ability to restore a virtual machine to a different location or under different configuration can be complicated since the backed up data may be incompatible with the destination location.

BRIEF DESCRIPTION OF THE DRAWINGS

In order to describe the manner in which at least some of the advantages and features of the invention can be obtained, a more particular description of embodiments of the invention briefly described above will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF THE PREFERRED EMBODIMENTS

Figure 1:
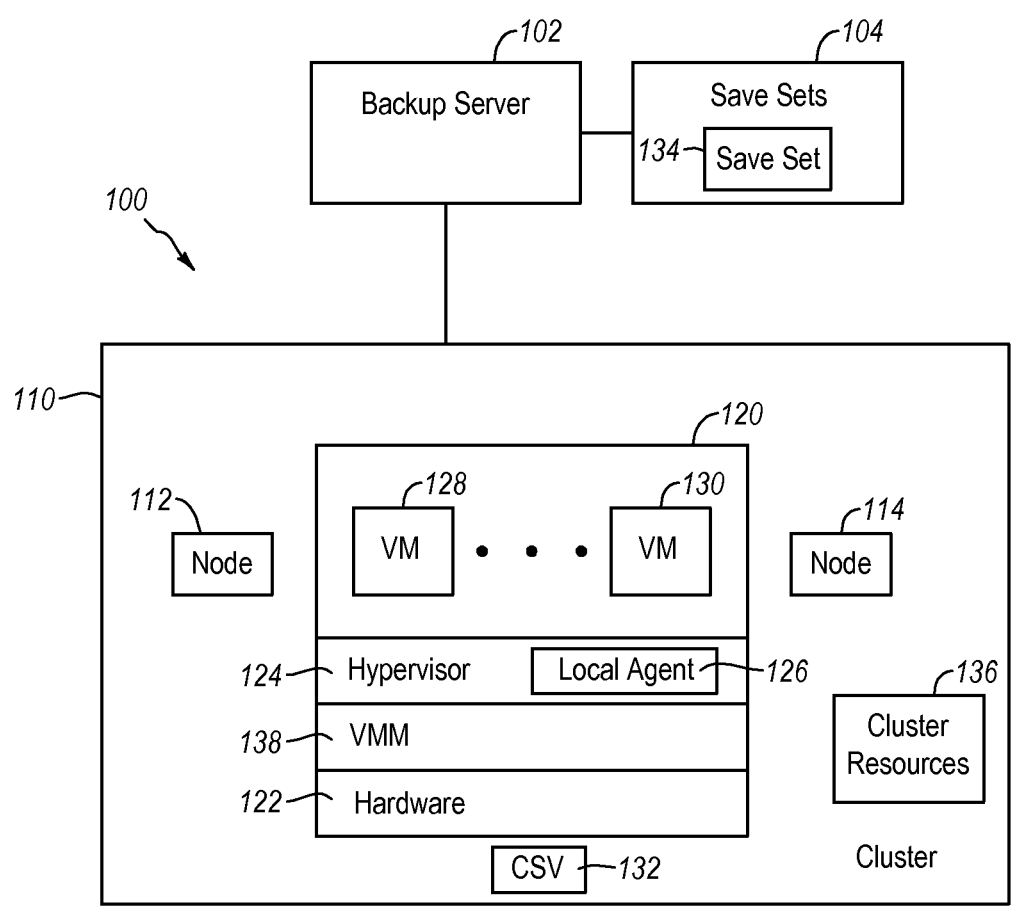
FIG. 1 illustrates a block diagram of an example of a cluster environment and of a backup system configured to backup and restore virtual machines operating in the cluster environment.

Embodiments of the invention relate to systems and methods for backing up and/or restoring virtual machines and/or data associated with virtual machines. Embodiments further relate to systems and methods for backing up and restoring virtual machines in a cluster environment.

A computer cluster (cluster) is a group of devices that are configured to work together. The cluster typically includes one or more computing devices. Each computing device may be a node of the cluster. Each node may be, by way of example only, a server computer running server software or other computing device. Each node may also be configured with a virtual machine manager (VMM) or a hypervisor layer that enables one or more virtual machines to be implemented on each node.

A cluster can provide high availability and typically provides improved performance compared to a stand-alone computer. A cluster has the ability, for example, to adapt to problems that may occur with the virtual machines operating therein. For example, when a node fails, the cluster provides a failover procedure that enables another node to take over for the failed node. Virtual machines or operations of the virtual machines on the failed node may be taken up by other virtual machines on other nodes.

A cluster may also include cluster resources. Cluster resources exist on nodes in the cluster and can migrate between nodes in the cluster. A cluster resource can be a physical resource, a software resource or the like that can be owned by a node. Often, the cluster resource is owned by one node at a time. In addition, the cluster resource can be managed in the cluster, taken online and/or offline. Further, a cluster resource may also abstract the service being provided to the cluster. As a result, the cluster only understands that a cluster resource is available and can be used by any node in the cluster. However, ownership of the cluster resource belongs to the node using the cluster resource. A cluster resource may have its own IP address and name, for example. The name and IP address of the cluster resource is independent of other cluster resources. This allows the cluster resource to be contacted no matter on which node the cluster resource resides.

Embodiments of the invention include systems and/or methods for backing up and/or restoring cluster or virtual machines that are instantiated on nodes in the cluster. For example, when backing up a virtual machine, a call for backup of a virtual machine is made. The call or command often initiates with a backup server. Once the command for backup is issued, a snapshot of the virtual machine or of the Virtual Hard Disks (VHDs) associated with the virtual machine are performed. As used herein, a virtual hard disk or a VHD is not limited to any particular format.

Next, configuration information is collected. The configuration information can be collected using an instrumentation interface (e.g., an application programming interface (API)). The instrumentation API can be used to collect configuration information about the virtual machine and/or the cluster. The configuration information generated during this part of the backup operation is included in the save set (save sets may also be referred to herein as a backup) of the virtual machine. The configuration information may be included as metadata for example.

During the restore operation, the instrumentation API can be called to collect configuration information associated with the destination of the save set being restored during the restore operation. Advantageously, the configuration information of the destination can be compared with the configuration information included with the save set. Inconsistencies or compatibilities with respect to the configuration information can then be identified and resolved to facilitate the restore of the save set.

In one example, embodiments of the invention may use the export and import operations associated with exporting and importing virtual machines in the context of backing up and/or restoring a virtual machine. During export of a virtual machine, configuration information is often generated. Similarly, during import of a virtual machine, similar configuration information is generated. In the context of a backup or restore operation, however, the export/import mechanisms can be used to perform the backup and/or the restore of a virtual machine in a cluster by, for example, providing a mechanism to generate and collect at least some of the configuration information.

Configuration information, as used herein, may include one or more of a description of a state of the virtual machine, a description of a location of the configuration description file for the VM, and a description of a location of the VHDs of the virtual machine. The configuration may also include a description of properties of the VM and/or the VM namespace, and/or the cluster such as, but not limited to, virtual export settings, global settings, system settings, resource allocation settings, memory settings, processor settings, cluster resource settings, and/or other settings associated with the virtual machine and/or the cluster. The configuration information is included in the save set during a backup operation.

FIG. 1 illustrates an example of a computer system 100. The computer system 100 illustrated in FIG. 1 may include one or more networks or network configurations. The computer system 100 includes storage configured to store data of varying types (e.g., applications, email, video, image, text, database, user data, documents, spreadsheets, or the like or any combination thereof). In the computer system 100, the data or a portion thereof is backed up and restored by a backup server 102. The backup of the data may be continuous, periodically, on a requested or scheduled basis. The backup server 102 generates save sets 104. The save sets 104 correspond, in one example, to the virtual machines in the computer system 100.

The computer system 100 includes a computer cluster 110 (cluster 110). The cluster 110 includes one or more nodes, illustrated as node 112, node 114 and node 120. Each node includes or is associated with hardware. The node 120 is associated with hardware 122. The hardware 122 can include processors, network adapters, memory of various types, caches, and other chips that may be used in enabling the operation of the hardware 122. The hardware 122 may be a computing device having an operating system (e.g., a server computer).

In this example, the hardware 122 is configured to support the operation of the cluster 110. In the cluster 110, the nodes 112, 114, and 120 may each be associated with different hardware (e.g., each node may be a distinct or separate computing device). Alternatively, the nodes 112, 114, and 120 may be configured such that the hardware is shared or such that certain hardware, such as a hard disk drive, is shared. The nodes 112, 114, and 120 or the virtual machines instantiated thereon may utilize the same storage, processor group, network adapter, or the like or any combination thereof.

The hardware 122 of the cluster 110 may include one or more cluster shared volumes (CSV). The CSV 132 is an example of a cluster shared volume. The CSV 132 is a volume configured such that more than one virtual machine (discussed below) can use the same physical disk even if not on the same node. In addition, the virtual machines that may be using the CSV 132 can move to different nodes (e.g., during failover or for another reason) independently of each other. In one example, the various virtual machines operating in the cluster 110 can move from or transfer one node to another node for different reasons.

FIG. 1 further illustrates that a virtual machine manager (VMM) 138 and a hypervisor 124 are installed on or are operating on the node 120. The hypervisor 124 and the VMM 138 are typically software that cooperate to create and manage virtual machines on a host machine or on host hardware such as the hardware 122 of the node 120. Each of the nodes 112 and 114 may also include a hypervisor 124 and a VMM 138. The hypervisor 124 operates to abstract the hardware 122 in order to instantiate virtual machines.

In FIG. 1, the node 120 supports virtual machines represented as virtual machines 128 and virtual machine 130. Each virtual machine 128 and 130 may include or be associated with one or more virtual hard disk (VHDs). Although reference is made to VHDs, one of skill in the art can appreciate that many formats may be used. A virtual hard disk may be, in one example, a file that is configured to be used as a disk drive for a virtual machine or that is a representation of a virtual machine. In one example, the virtual machines 128 and/or 130 can be encapsulated in a file or in a file structure. The virtual hard disk of the virtual machine 128 and the virtual hard disk of the virtual machine 130 may both reside on the CSV 132.

FIG. 1 further illustrates the backup server 102. The backup server 102 may communicate with the cluster 110. The backup server 102 is configured to generate save sets 104. The save set 134 is an example of a save set. The save sets 104 in general correspond to backups of the virtual machines in the cluster 110. Each save set in the save sets 104 may be a backup of one or more of the virtual machines operating in the cluster 110.

In this example, the save set 134 may be a backup of the virtual machine 128. Other save sets in the save sets 104 may be other backups of the virtual machine 128 of other virtual machines. The save sets may be configured such that the virtual machine (e.g., the virtual machines 128 and 130) can be restored at any point in a given time period. Embodiments of the invention also enable the save set 134 to be restored at a location that may be different from the location at which the backup was performed. For example, a backup of the virtual machine 128 may be restored to the node 112, to another cluster, or to a stand-alone machine.

A backup of the virtual machine 128 (or portion thereof) or of the cluster 110 can be initiated in various ways (e.g., periodically, on request, or the like). The backup server 102 can coordinate with a local agent 126 when performing a backup or a restore of a virtual machine on the node on which the local agent 126 resides. In one example, a single local agent 126 can be instantiated on one of the nodes and the local agent 126. The local agent 126 may be one of the cluster resources 136. The local agent 126 can coordinate a backup or restore of a virtual machine on the node on which the local agent resides. Further, the local agent 126 can operate on any of the nodes in the cluster 110. Alternatively, each node in the cluster 110 may be associated with a local agent.

In one example, the backup server 102 may perform the backup of a virtual machine in a manner that preserves configuration information about the virtual machine and/or of the cluster 110. By preserving or by incorporating the configuration information into the save set 134 (e.g., as metadata), a redirected restore (e.g., restoring a previously backed up virtual machine to another location in the cluster 110 or to another location in a different cluster or to a different location) can be performed in a manner that avoids problems associated with different disk structures, different directory structures, access control lists (ACLs), or the like.

The configuration information can be obtained using an export/import mechanism associated with the virtual machine and/or by accessing an instrumentation interface to obtain the configuration information. Advantageously, this protects the restore process from some of the problems associated with a conventional restore process. For example, because the format of the description files of the virtual machine may change or because the locations of files (the directory structure) within a virtual machine can change over time or as new product releases occur, the export/import mechanism or the use of the instrumentation interface provides a way to facilitate the restoration of a virtual machine to the same location or to another destination.

The configuration information may include the location of the root directories of the virtual machine files, and the directory that contains snapshots (another type of file and which may be used in a virtual environment) of the virtual machine, and the directory containing the virtual hard disk files. This information may be constructed using an export command or using a programming interface (e.g., an API such as an instrumentation interface) that can be used to identify configuration information associated with the virtual machine.

For example, in a virtual machine using a WINDOWS® operating system, a WMI (Windows Management Instrumentation API) module or component can be used to acquire the configuration information. The instrumentation interface can be accessed, for example, using a script or using Powershell in one embodiment. The configuration information acquired for a VM may include, by way of example only, a display name, a FQDN (Fully Qualified Domain Name), a data root directory, a user snapshot directory and a list of user snapshots, hard disk controller configuration, virtual hard disks directories and a list of virtual hard disks, virtual network adapter(s) used and associated properties, memory usage, processor usage, or the like or any combination thereof.

The configuration information for a cluster may include, by way of example only, a cluster address and a cluster name, addresses and/or names of individual cluster nodes, cluster adapters, cluster resources (including all VMs in the cluster), cluster adapter configurations, cluster storage layout and configuration, or the like or any combination thereof.

The instrumentation interface can be used to discover at least some of the configuration information that is included in the save set generated during a backup operation by the backup server. The operating system providing the instrumentation interface that is queried to acquire the configuration information may be the operating system of the virtual machine or an operating system associated with the cluster 110 (e.g., an operating system of the node itself). In one example, the configuration information may be obtained from the virtual machine being backed up and/or from the cluster 110 or from one of the nodes.

Figure 2:
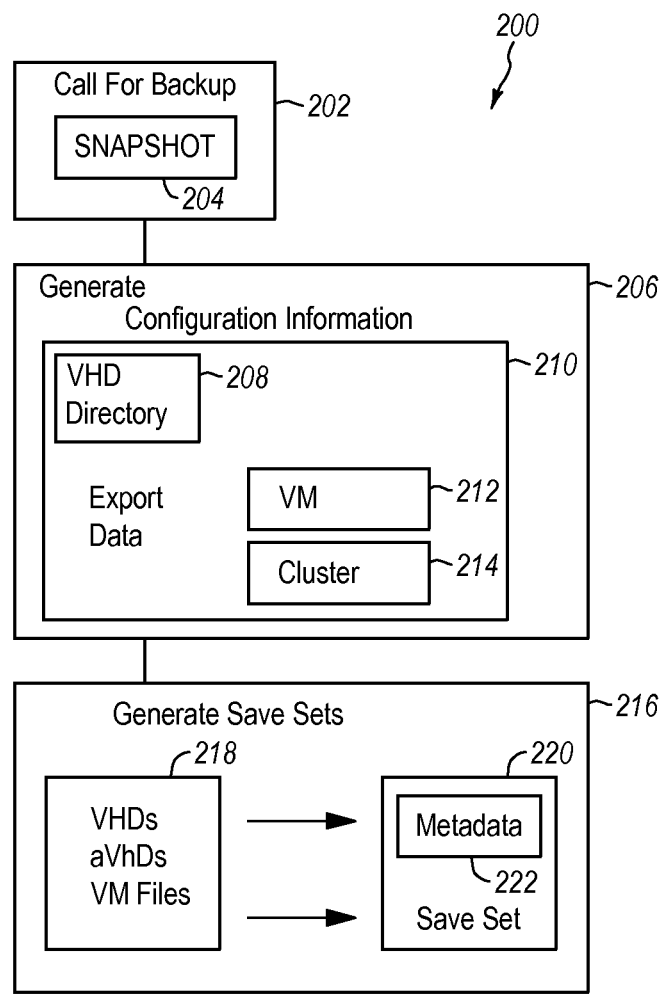
FIG. 2 illustrates an example of a method for backing up a virtual machine in a cluster environment.

FIG. 2 illustrates a method for performing a backup of a virtual machine in an environment such as a cluster. The method 200 may begin when a backup server calls for backup or issues a command for backup in block 202. The call or command for backup may be delivered to and received by the local agent 126. The command may identify the virtual machine to be backed up. When a call for backup is made, the local agent may interface with a local service (e.g., a snapshot provider to ensure that a snapshot of the virtual machine is performed in block 204. The snapshot may be performed by the cluster 110 or by the relevant node in the cluster 110. The snapshot may be stored in a snapshot directory.

Once the snapshot is completed in block 204, a configuration of the virtual machine is constructed in block 206. In other words, the configuration information to be included in the save set is generated in block 206. The configuration includes configuration information associated with the virtual machine and/or with the cluster in which the virtual machine exists.

Constructing the configuration information in block 206 can include obtaining information relating to the configuration of the virtual machine being backed up and/or the node on which virtual machine is instantiated and/or the cluster in which the virtual machine operates. In one example, the configuration information is determined using an instrumentation interface (e.g., WMI API) to obtain the configuration information in the context of exporting the virtual machine. However, this configuration information obtained is not necessarily used to export the virtual machine. Rather, the configuration information obtained in this manner is incorporated into the save set being generated by the backup of the virtual machine. In this sense, the export and import mechanisms can be used in the context of backup and restore operations.

The configuration information 210 generated in block 206 can include export data. The export data, which may be obtained when an export call is made for the virtual machine and which may be incorporated into the save set, may identify, by way of example, a virtual hard disk directory 208 or location thereof, a VM 212 or files thereof, cluster 214 and/or configurations thereof.

In one example (and after a snapshot is performed), all files associated with the virtual machine are in a persistent state and the local agent operating in the hypervisor layer prepares the VM export layout information. Thus, the export data 210 can include, in one example, one or more of a location of the virtual machine's snapshots, a state of the virtual machine, virtual hard disk locations, or the like or combination thereof. The export data (which may be included in a file) may be included in the save set along with the virtual hard disks, the aVHDs or snapshot files, and other VM associated files.

In block 216, the backup directories and/or files associated with the virtual machine (e.g., the VHDs, aVHDs, VM files 218) are included in the save set 220 and/or in metadata 222 associated with the save set 220. The configuration information is also included in the save set 220, often in the metadata 222.

Once a save set has been created during a backup process, the save set is included in the save sets and is then available for a restore operation. A virtual machine can be restored to the same node, to a different node in the same cluster, or to another node in a different cluster, or to a node that is not part of a cluster.

As previously stated, the restore process can be complicated by changes in the cluster environment. For example, restoring a virtual machine to a different destination in the same cluster is problematic because of changes in the environment with respect to the backed up virtual machine. The virtual hard disk path, network adapter, cluster configurations, ACLs or the like may be different from the original location of the virtual machine and are examples of issues that occur during the restore process. These problems may exist in part because these aspects of the virtual machine were not associated with a real account and may no longer exist in the cluster.

Embodiments of the invention can restore a save set by accounting for the differences that may exist between the destination of the restored virtual machine and the location of the virtual machine when previously backed up. In one example, the configuration information or export data included in the save set can be compared to similar data associated with the destination. Once these differences are determined, the restore process can adapt to restoration of the save set to account for these differences.

In one example, the restore operation may copy the save set to the desired destination location and then recover the virtual machine by using the configuration information to locate and restore the virtual hard disks and associated snapshots or the VHDs and aVHDs, invoke the instrumentation interface to import the virtual machine with the restore destination directory. The virtual machine can be imported using existing and/or newly generated configuration information or by accounting for differences between these configuration information sets.

Figure 3:
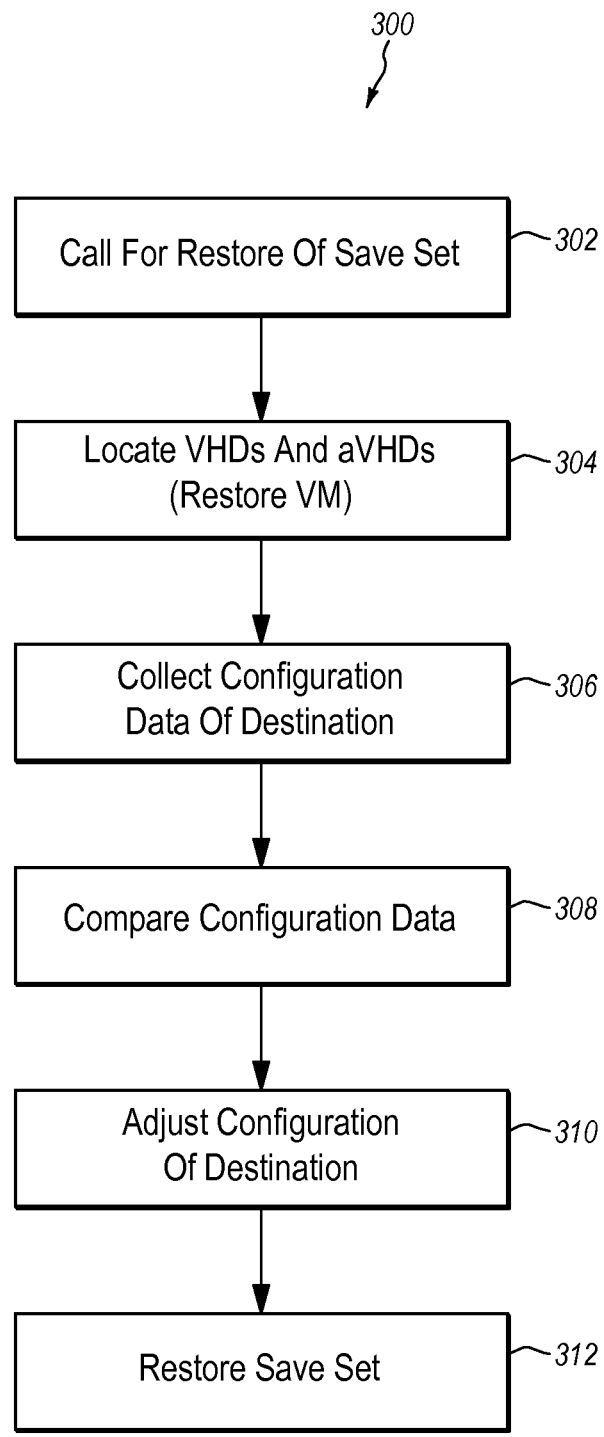
FIG. 3 illustrates an example of a method for restoring a virtual machine in a cluster environment.

FIG. 3 illustrates an example method for restoring a save set. In block 302, a call for restoring a save set is made. The call may be made by a local agent or by the backup server. In block 304, the save set of the VM being restored is copied to the destination location in one example. Alternatively, the save set is prepared to be restored.

In block 306, the configuration information associated with the destination may be acquired. In one example, an instrumentation interface is used to acquire the same or similar configuration information that was acquired from the location of the VM when the save set was originally generated.

In block 308, the configuration information from the destination is compared with the configuration information that was included with the save set. In block 310, adjustments may be made to the save set or to the metadata in order to ensure that the restoration of the VM is compatible with the destination. For example, changes in the directory structure, VM configuration (processor, memory, network adapter), cluster configurations, or the like are accounted for in block 308. This may include making changes to the save set and/or metadata of the save set.

In block 312, the save set is then restored. This can be achieved using an import command with an existing guide file (e.g., an export file) or a newly generated guide or export file. For example, if there is a change in the directory structure, the comparison enables the VHDs and the aVHDs to be transferred from the location identified in the configuration information included in the save set to the appropriate destination based on the configuration information of the destination.

Identifying the differences in the configuration information sets enables potential issues to be handled. For example, if the original virtual machine used a software network adapter, it can be determined that this network adapter is not available and an appropriate change can be made.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for backing up a virtual machine in a cluster environment, the method comprising:
receiving a command to back up a virtual machine at a computing device, the computing device configured with a hypervisor layer that abstracts hardware of the computing device;

accessing an instrumentation interface of an export mechanism to obtain configuration information of both the virtual machine and the cluster environment, wherein the export mechanism is configured to export the virtual machine, wherein the export mechanism is leveraged to obtain the configuration information without exporting the virtual machine, wherein the configuration information includes first data describing a configuration of the virtual machine and second data describing a configuration of the cluster environment of the virtual machine;

creating a save set that is a backup of the virtual machine;

incorporating the configuration information into the save set so that the save set includes both the backup of the virtual machine and the configuration information, wherein incorporation of the configuration information into the save set permits the save set to be restored to a destination in the cluster environment whose configuration information is different from the configuration information that is incorporated in the save set; and storing the save set, wherein the configuration information allows a restore operation to identify differences between the configuration information included in the save set and configuration information of the destination of the virtual machine during the restore operation, copy the save set to a destination location, and import the virtual machine from the destination location to a restore destination directory using an import mechanism that accounts for the differences by changing the configuration information included in the save set based on the configuration information of the destination, wherein accounting for the differences between the configuration information included in the save set and the configuration information of the destination further includes transferring a virtual hard disk of the virtual machine from a location identified in the configuration information included in the save set to an appropriate destination based on the configuration data of the destination.

2. The method of claim 1, wherein determining configuration information comprises calling the instrumentation interface of an application programming interface.

3. The method of claim 1, wherein determining configuration information comprises one or more of:
identifying a location of a root directory of files associated with the virtual machine;
identifying a location of snapshots associated with the virtual machine;
identifying a location of virtual hard disks associated with the virtual machine; or
identifying a location of an export file generated by the export mechanism that contains a configuration of the virtual machine and a configuration of the environment.

4. The method of claim 1, further comprising including, in the configuration information, one or more of a location of a root directory of files, a location of one or more snapshots, a location of one or more virtual hard disks, or a location of an export file generated by the export mechanism.

5. The method of claim 1, further comprising taking a snapshot of the virtual machine after receiving the command to back up the virtual machine and before determining the configuration information.

6. The method of claim 1, further comprising receiving the command for a backup at a local agent operating in the hypervisor.

7. The method of claim 1, wherein the configuration information associated with the virtual machine is included in the save set as metadata.

8. The method of claim 1, wherein the creation of the save set and the generation of the configuration data associated with the virtual machine are both performed by the same entity.

9. The method of claim 1, wherein the export/import mechanism is associated with the virtual machine.

10. The method of claim 1, wherein export data generated by the export mechanism and included in the configuration information comprises one or more of a virtual hard disk directory, a location of a virtual hard disk directory, a virtual machine, files of a virtual machine, a cluster, or a configuration of a cluster.

11. A non-transitory storage medium having stored therein computer-executable instructions which, when executed by one or more hardware processors, perform a backup of a virtual machine in a cluster environment, wherein performance of a backup of a virtual machine comprises:
receiving a command to back up a virtual machine at a computing device, the computing device configured with a hypervisor layer that abstracts hardware of the computing device;
accessing an instrumentation interface of an export mechanism to obtain configuration information of both the virtual machine and the cluster environment leveraging the export mechanism to generate an export file for the virtual machine without exporting the virtual machine with the export mechanism, wherein the export file includes configuration information for the virtual machine and the cluster environment;
creating a save set that is a backup of the virtual machine;
incorporating the configuration information into the save set so that the save set includes both the backup of the virtual machine and the configuration information, wherein incorporation of the configuration information into the save set permits the save set to be restored to a destination in the cluster environment whose configuration information is different from the configuration information that is incorporated in the save set; and
storing the save set, wherein the export file allows the save set to be restored by a restore operation by invoking an import mechanism at the destination, wherein the restore operation copies the save set to a destination location and uses the import mechanism to import the save set to a restore destination directory, wherein the import mechanism accounts for differences between the configuration information included in the save set and configuration information of the destination by changing the configuration information included in the save set based on the configuration information of the destination,
wherein accounting for the differences between the configuration information included in the save set and the configuration information of the destination includes transferring a virtual hard disk of the virtual machine from a location identified in the configuration information included in the save set to an appropriate destination based on the configuration data of the destination.

12. The non-transitory storage medium of claim 11, wherein the management instrumentation is associated with an application programming interface.

13. The non-transitory storage medium of claim 11, wherein the import mechanism allows the virtual machine to be backed up and restored without restoring the access control lists of the virtual machine.

\* \* \* \* \*